United States Patent
Maruoka

(10) Patent No.: US 9,634,307 B2
(45) Date of Patent: Apr. 25, 2017

(54) BATTERY PACK

(71) Applicant: NEC ENERGY DEVICES, LTD., Sagamihara-shi, Kanagawa (JP)

(72) Inventor: Kazunori Maruoka, Sagamihara (JP)

(73) Assignee: NEC ENERGY DEVICES, LTD., Sagamihara (JP)

( * ) Notice: Subject to any disclaimer, the term of this patent is extended or adjusted under 35 U.S.C. 154(b) by 283 days.

(21) Appl. No.: 14/422,222

(22) PCT Filed: Sep. 2, 2013

(86) PCT No.: PCT/JP2013/073565
§ 371 (c)(1),
(2) Date: Feb. 18, 2015

(87) PCT Pub. No.: WO2014/034932
PCT Pub. Date: Mar. 6, 2014

(65) Prior Publication Data
US 2015/0228945 A1 Aug. 13, 2015

(30) Foreign Application Priority Data

Sep. 3, 2012 (JP) .................. 2012-193145

(51) Int. Cl.
*H01M 2/10* (2006.01)
*H01M 2/02* (2006.01)
*H01M 2/20* (2006.01)

(52) U.S. Cl.
CPC ....... *H01M 2/1077* (2013.01); *H01M 2/0212* (2013.01); *H01M 2/206* (2013.01); *H01M 2220/20* (2013.01)

(58) Field of Classification Search
None
See application file for complete search history.

(56) References Cited

U.S. PATENT DOCUMENTS

2007/0207377 A1 9/2007 Han et al.
2008/0193838 A1 8/2008 Oh
(Continued)

FOREIGN PATENT DOCUMENTS

CN 101552349 A 10/2009
CN 102024976 A 4/2011
(Continued)

OTHER PUBLICATIONS

Communication, dated Jun. 2, 2016, from the State Intellectual Property Office of the P.R.C., in counterpart Chinese application No. 201380044098.4.
(Continued)

*Primary Examiner* — Miriam Stagg
*Assistant Examiner* — Wojciech Haske
(74) *Attorney, Agent, or Firm* — Sughrue Mion, PLLC

(57) ABSTRACT

Provided is a battery pack that is unlikely to be affected by vibration, shock, or the like, and has stable characteristics. A battery pack includes a battery module 300 that is made by stacking battery holding bodies 200 on which film-covered batteries are placed with positive- and negative-electrode pull-out tabs being taken out from the same side in such a way that sides from which the positive- and negative-electrode pull-out tabs are pulled out are aligned with each other, wherein: an extension tab connected each of the tabs is pulled out from a battery holding body in such a way as to extend in a direction perpendicular to a direction of the pull-out tab and in a direction opposite to the other pull-out tab; and the extension tabs are each bent along a side surface in a direction perpendicular to a battery stacking surface, and are stacked up and electrically connected.

13 Claims, 11 Drawing Sheets

(56) References Cited

U.S. PATENT DOCUMENTS

| | | |
|---|---|---|
| 2008/0199765 A1 | 8/2008 | Yoon et al. |
| 2012/0003520 A1 | 1/2012 | Lee et al. |
| 2012/0135288 A1 | 5/2012 | Meintschel |

FOREIGN PATENT DOCUMENTS

| | | |
|---|---|---|
| JP | 2006-179411 A | 7/2006 |
| JP | 2006-253060 A | 9/2006 |
| JP | 2007-073510 A | 3/2007 |
| JP | 2008-535157 A | 8/2008 |
| JP | 2009-512982 A | 3/2009 |
| JP | 2009-105058 A | 5/2009 |
| JP | 2011-198660 A | 10/2011 |
| JP | 2012-502425 A | 1/2012 |
| JP | 2012-519349 A | 8/2012 |
| JP | 2012-212593 A | 11/2012 |
| KR | 10-2007-0025391 A | 3/2007 |
| WO | 2006/059421 A1 | 6/2006 |

OTHER PUBLICATIONS

International Search Report of PCT/JP2013/073565 dated Oct. 8, 2013.

BATTERY PACK

CROSS REFERENCE TO RELATED APPLICATIONS

This is a National Stage of International Application No. PCT/JP2013/073565 filed Sep. 2, 2013, claiming priority based on Japanese Patent Application No. 2012-193145 filed Sep. 3, 2012, the contents of all of which are incorporated herein by reference in their entirety.

TECHNICAL FIELD

The present invention relates to a battery pack that includes a battery module in which a plurality of film-covered batteries are stacked.

BACKGROUND ART

In devices that use a battery as a drive power source, such as electric bicycles, electric motorcycles, and electric cars, a battery pack that houses large-capacity secondary batteries is used. Lithium-ion batteries that are high in both volumetric energy density and mass energy density are suitable as drive-power-source batteries.

Among the known lithium-ion batteries are a columnar battery, which is made by winding up a laminated product in which a positive electrode and a negative electrode are stacked through a separator, and a flat battery, which is a laminated product in which a positive electrode and a negative electrode are stacked through a separator.

Among those batteries, the flat battery is suitable as a power-source battery for a power motor and the like, because the capacity can be easily increased per unit battery by increasing the areas of the positive and negative electrodes or by increasing the number of positive and negative electrodes stacked.

In a unit battery of a flat-type lithium-ion battery, a battery element is covered with a film exterior material. Therefore, it is possible to make effective use of high energy density that the lithium-ion battery has.

What has been proposed is a battery pack that includes a battery module in which a film-covered battery, whose positive- and negative-electrode pull-out tabs have been pulled out from sides of the battery that face each other, is stacked as a peripheral heat-sealing portion is held by a frame-like member in which an opening is provided in a portion corresponding to a power generation element (Refer to Patent Document 1, for example).

PRIOR ART DOCUMENT

Patent Document
Patent Document 1: JP2006-253060A

SUMMARY OF THE INVENTION

Problems to be Solved by the Invention

As a battery pack that is used as a power source for a device that generates vibration during operation, such as electric cars, electric motorcycles, or electric bycicles that use a drive power source or an auxiliary drive power source, a battery pack that is not adversely affected by vibration is required. For example, as disclosed in Patent Document 1, what is proposed is a battery pack in which a film-covered battery is mounted in an opening corresponding to a power generation element inside a frame body, with a peripheral heat-sealing portion held by the frame body. However, in the battery pack disclosed in the above patent document, positive- and negative-electrode pull-out tabs are taken out from different sides of each unit battery that face one another. Accordingly, a difference occurs between the positive electrode's side and the negative electrode's side in the length of wires that are disposed between the electrodes and a device using power of the battery and which extend to a device that controls the inputting or outputting of current to or from the battery. Therefore, problems arise, such as the unevenness of current flowing through each battery module. Moreover, in order to exert maximum efficiency in electric bicycles and the like, a lightweight battery pack that is high in strength is required.

Means for Solving the Problems

The problems of the present invention are solved by a battery pack that includes a battery module that is made by stacking battery holding bodies on which film-covered batteries are placed with positive- and negative-electrode pull-out tabs being taken out from the same side in such a way that sides from which the positive- and negative-electrode pull-out tabs are pulled out are aligned with each other, wherein: an extension tab is connected to at least the positive- or negative-electrode pull-out tab; the extension tab connected to the positive-electrode pull-out tab extends in a direction perpendicular to a direction of the positive-electrode pull-out tab, and is pulled out from a battery holding body; the extension tab connected to the negative-electrode pull-out tab extends in a direction that is perpendicular to a direction of the negative-electrode pull-out tab and opposite to the direction of the extension tab connected to the positive-electrode pull-out tab, and is pulled out from a battery holding body; and the extension tabs are each bent along a side surface in a direction perpendicular to a battery stacking surface, and are stacked up and electrically connected.

In the battery pack, a positive- or negative-electrode pull-out tab of the battery that is located in an outermost layer of the battery module is screwed at a position parallel to a stacking surface regardless of whether or not the extension tab is connected.

In the battery pack, the battery modules are electrically connected together in such a way that, among end surfaces of the battery modules, the sides of each film-covered battery from which the positive- and negative-electrode pull-out tabs are pulled out face each other, and that an insulation member is placed between the modules.

In the battery pack, side surfaces of the battery modules are reinforced by a common reinforcing member; and, in locations except where the battery modules are connected together, the insulation member protrudes along a stacking direction more than the tab, thereby preventing a short circuit between the battery modules.

In the battery pack, the battery holding body is one that is made up of only a frame body on which an outer peripheral portion of a film-covered battery is stacked, or one that includes a support body to cover an entire surface of the frame body.

In the battery pack, in the frame body of the battery holding body, both a stacking surface-side concave section, which has an opening communicating with a stacking surface side of a film-covered battery, and an outer peripheral surface-side concave section, which has an opening on an outer peripheral surface of the frame body, are formed; on an outer peripheral surface side of the stacking surface-side concave section, a flat portion is formed.

In the battery pack, the battery holding body is bilaterally asymmetric when seen from a stacking surface side of the film-covered battery.

In the battery pack, one side surface of the holding body has a screw hole used for connecting positive- and negative-electrode extension tabs together; and the other side surface of the holding body includes a protruding section that makes it possible to prevent improper connection and elongate a creepage distance.

In the battery pack, the holding bodies are turned upside down and alternately stacked in such a way that the sides from which the positive- and negative-electrode pull-out tabs are pulled out are being aligned with each other.

In the battery pack, a portion in which voltage applying sections of different polarities face each other is filled with an insulation composition via an opening.

In the battery pack, a battery management unit that includes a battery charge-and-discharge control circuit and a battery protective circuit is disposed on a side where the positive- and negative-electrode pull-out terminals do not face each other.

In the battery pack, the battery modules are different in size; and the battery management unit is placed on a small battery module.

The battery pack is used in an electric bicycle or electric motorcycle; and, in the modules, the positive- and negative-electrode pull-out tabs are disposed in a downward direction.

Advantages of the Invention

The battery pack of the present invention is made by connecting extension tabs to the positive- and negative-electrode pull-out tabs that are taken out from the same side of a film-covered battery, mounting on the battery holding bodies, and connecting the extension tabs. Therefore, it is possible to make wires short and make the wires of the positive- and negative-electrode sides equal in length. Thus, it is possible to provide a battery pack with excellent electric characteristics. It is also possible to mitigate vibration and shock against each film-covered battery. Therefore, regardless of the pull-out directions of the positive- and negative-electrode pull-out tabs of each film-covered battery, the direction of being mounted on a device that uses the battery can be freely set. Accordingly, even if the battery pack, when being used, is constantly subjected to vibration or shock like a battery pack for an electric bicycle, the battery pack is expected to operate stably over a long time. It is possible to provide a battery pack with a high degree of freedom in terms of being placed in an electric bicycle or the like.

BEST MODE FOR CARRYING OUT THE INVENTION

Figure 1:
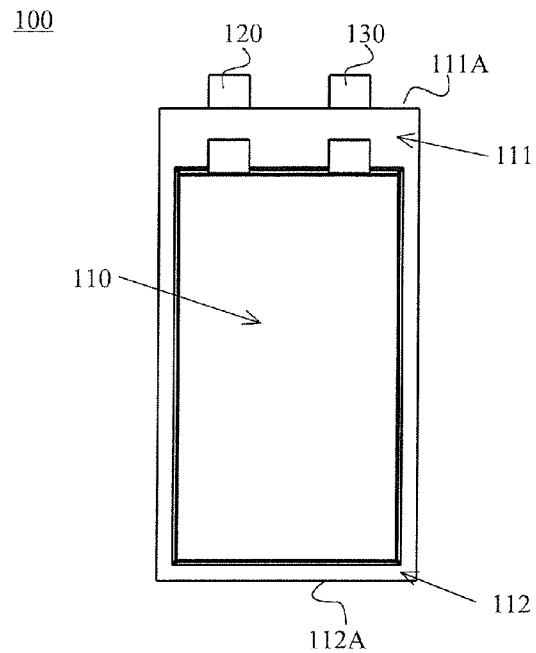
FIG. 1 is an external view of one example of a film-covered battery used in a battery pack of the present invention.

FIG. 1 is an external view of one example of a film-covered battery used in a battery pack of the present invention.

In a film-covered battery 100, on an outer surface's side, films that are high in weather resistance are laminated. On an inner surface's side, a film exterior material in which heat-sealing resin layers are laminated is used. In one example, on the outer surface's side of aluminum foil, films that are high in weather resistance, such as polyamide or polyethylene terephthalate, are laminated. On the inner surface's side, layers, such as heat-sealing synthetic resin films like polyethylene films, may be laminated as a laminated film.

The film-covered battery 100 includes a positive electrode, which carries positive-electrode active material; a negative electrode, which carries negative-electrode active material; a battery body section 110, which includes an electrolysis solution; an upper end section 111; an upper end section outer edge 111A; a lower end section 112; a lower end section outer edge 112A; a positive-electrode pull-out tab 120; and a negative-electrode pull-out tab 130. The film-covered battery 100 is produced by sealing the four sides of an outer peripheral portion through heat sealing after the electrolysis solution is poured.

The battery is not limited to the structure in which the four sides of an outer peripheral portion of two laminated films disposed on both surfaces are thermally sealed together as described above. The battery may be made by folding one laminated film to cover both surfaces of a battery element and then heat sealing together the remaining three sides after an electrolysis solution is poured.

In one example of the film-covered battery of the present invention, for the positive electrode of the battery body, slurry is made by mixing lithium-transition metal composite oxides, such as lithium-manganese composite oxides or lithium-cobalt composite oxides, with a conductivity imparting agent, such as carbon black, binder, and the like; the slurry is then applied and dried on a metal that is stable even when potential of a positive electrode is applied, such as aluminum foil.

The negative electrode that is to be used may be made by applying and then drying slurry, which is made by mixing lithium, a carbon material capable of doping or de-doping, and the like with a conductivity imparting agent, such as carbon black, binder, and the like, onto copper foil or the like.

Figure 2:
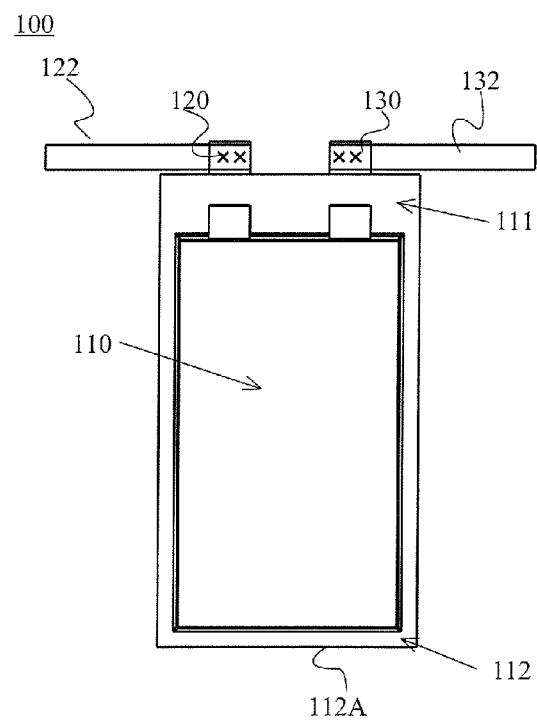
FIG. 2 is a diagram illustrating an extension tab that is joined to a film-covered battery of the present invention.

FIG. 2 is a diagram illustrating an extension tab that is joined to a film-covered battery of the present invention.

To the positive-electrode pull-out tab 120 of the film-covered battery 100, one end of a positive-electrode extension tab 122 is joined by welding means such as spot welding. The positive-electrode extension tab 122 is pulled out in a direction perpendicular to a direction in which the positive electrode is pulled out, and extends toward a side where a negative-electrode pull-out tab does not exist.

To the negative-electrode pull-out tab 130, a negative-electrode extension tab whose one end is joined to the negative-electrode pull-out tab is pulled out in a direction opposite to the direction in which the positive-electrode extension tab 122 is pulled out.

The extension tabs that are to be used may be made of nickel, nickel alloy, or the like.

FIG. 3 is a diagram showing one example of a battery holding body on which a film-covered battery of the present invention is mounted.

Figure 3A:
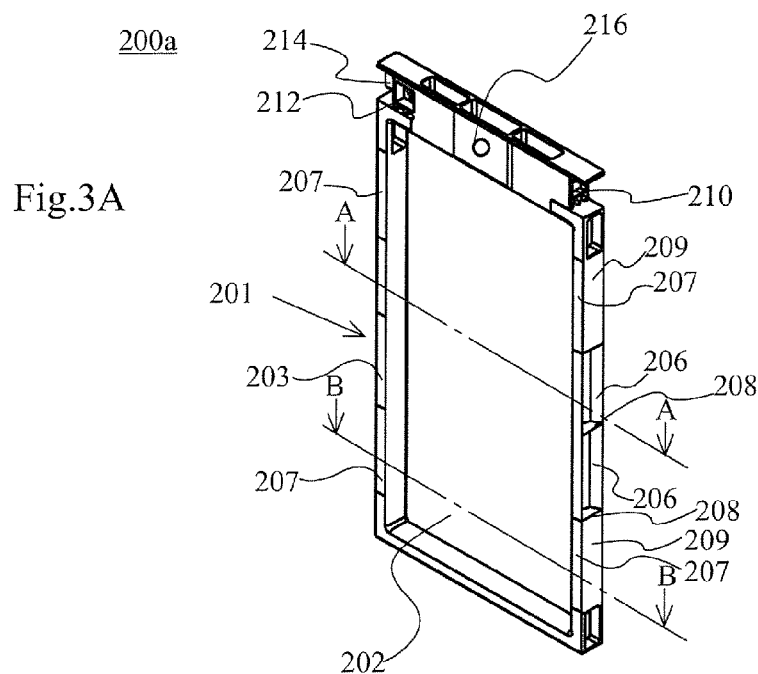
FIGS. 3A-3D are diagrams showing one example of a battery holding body on which a film-covered battery of the present invention is mounted.
Figure 3B:
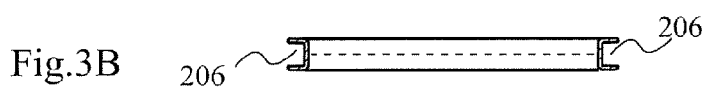
Figure 3C:
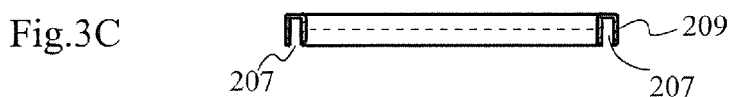

FIG. 3A is a perspective view. FIG. 3B is a cross-sectional view of FIG. 3A taken along X-X. FIG. 3C is a cross-sectional view of FIG. 3A taken along Y-Y.

Figure 3D:
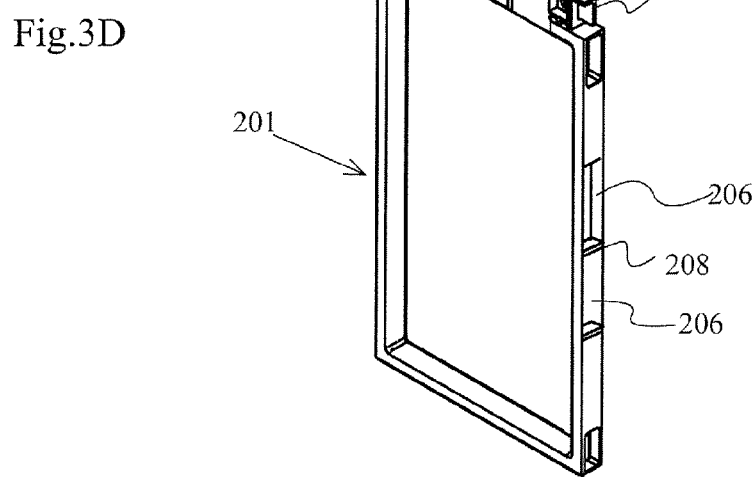

FIG. 3D is a view of a battery holding body when seen from a side opposite to that of FIG. 3A, which has an asymmetric structure.

A battery holding body 200*a* is a molded product that is made of synthetic resin that is high in strength, such as ABS or polycarbonate. Inside a frame body 201 in which a battery body section of a unit battery of a film-covered battery (not shown) is to be mounted, there are no wall surfaces, and a space section 202 is created.

A stacking surface 203 of the frame body 201 is a surface on which a heat-sealing portion of an outer peripheral portion of a film-covered battery and the like are stacked. On an inner surface's side that holds a battery body section in the space section 202 of the frame body 201, a smooth surface is formed.

In the frame body 201, portions that are different in cross-section shape are formed, and there are a plurality of concave sections that are different in the direction of openings. One concave section is an outer peripheral-side concave section 206 which has an opening only on an outer peripheral surface and which does not have any other opening. The other concave section is a stacking surface-side concave section 207 which has an opening only on the stacking surface where a heat-sealing portion of a film-covered battery is placed and which does not have any other opening.

End portions of the outer peripheral-side concave section 206 and stacking surface-side concave section 207 abut on another outer peripheral-side concave section or stacking surface-side concave section 207 across a partition wall 208.

In that manner, in the frame body, a plurality of concave sections that are different in the direction of openings are formed. Therefore, a lightweight battery holding body that is high in strength against shock or the like can be obtained. The concave sections that are different in the direction of openings can be sequentially disposed in such a way that the concave sections are arranged alternately in the frame body, or that one concave section is placed on the inner side and the other on the outer side. What is shown in this diagram is an example in which the concave sections are provided in the same portion as a pull-out direction A of the positive- and negative-electrode pull-out tabs of the frame body. Alternatively, the concave sections may be provided in a portion of a direction perpendicular to the pull-out direction A of the frame body.

All the concave sections have an opening on the outer surface of the frame body and the stacking surface. Therefore, the concave sections can be molded integrally by using dies.

On an outer peripheral-side surface of the stacking surface-side concave section, a flat surface 209 is formed. As shown in the diagram, if the stacking surface-side concave sections 207 are spaced out in a longitudinal direction of the film-covered battery, the flat surfaces 209 are formed in such a way as to be spaced out in a stacking direction and form a strip, after a predetermined number of battery holding bodies on which the film-covered batteries are mounted are stacked. Therefore, each of the flat surfaces can be used as an area to which a reinforcing member is attached.

In an upper end portion of a side surface of the battery holding body shown in FIG. 3, a side surface screw holding section 210 is provided. The side surface screw holding section 210 is used for electrical connection of a positive-electrode extension tab, which is connected to a positive-electrode pull-out tab of each film-covered battery and of a negative-electrode extension tab.

On a stacking surface that is adjacent to a side surface of a side opposite to the side where the side surface screw holding section is provided, a stacking surface screw holding section 212 is provided. The stacking surface screw holding section 212 is used for external electrical connection of an extension tab whose one end is connected to a positive-electrode pull-out tab or a negative-electrode pull-out tab.

On a stacking surface of a side opposite to the side where the stacking surface screw holding section 212 is provided, a protruding section 214 is provided in such a way that an end portion of the stacking surface extends outward. The protruding section 214 makes longer a creepage distance between adjacent positive- and negative-electrode extension tabs, and prevents improper connection. The protruding section 214 also functions to prevent contact of a conductor with a power supply section.

On a stacking surface where the surfaces of adjacent battery holding bodies come in direct contact with each other, at least one fitting concave section 216 and a fitting convex section 218, which corresponds to the fitting concave section 216, can be provided. Since the fitting concave section 216 and the fitting convex section 218 are provided, the battery holding bodies 200 can be easily positioned relative to each other when film-covered batteries are stacked after being mounted on the battery holding bodies 200.

FIG. 4 is a diagram showing another example of a battery holding body on which a film-covered battery of the present invention is mounted.

Figure 4A:
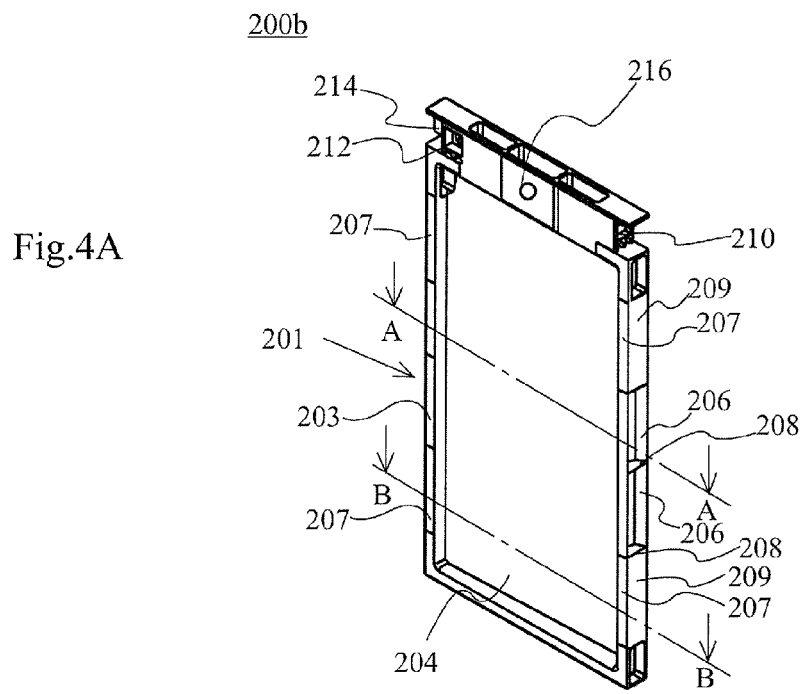
FIGS. 4A-4D are diagrams showing another example of a battery holding body on which a film-covered battery of the present invention is mounted.
Figure 4B:
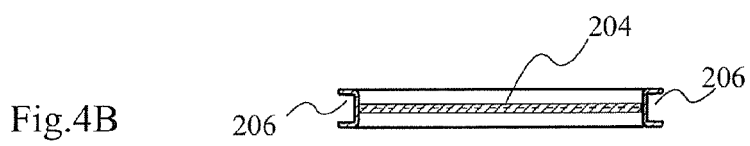
Figure 4C:
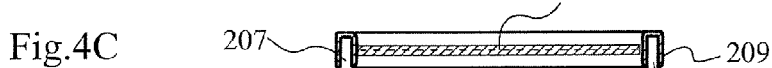

FIG. 4A is a perspective view. FIG. 4B is across-sectional view of FIG. 4A taken along A-A. FIG. 4C is a cross-sectional view of FIG. 4 taken along B-B.

Figure 4D:
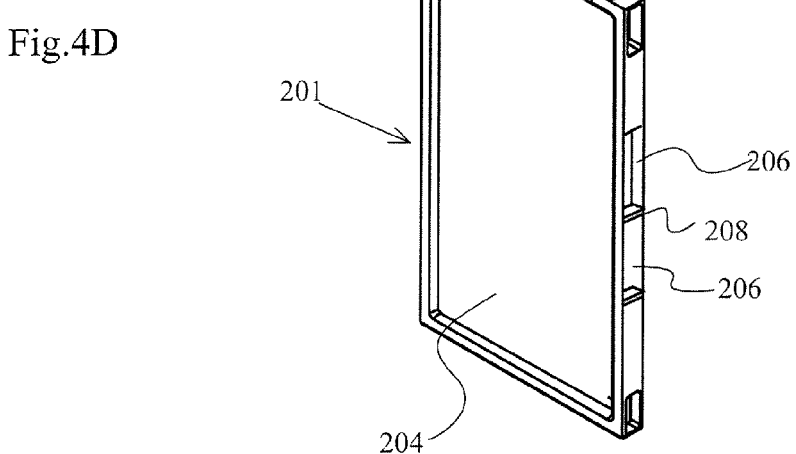

FIG. 4D is a view of a battery holding body when seen from a side opposite to that of FIG. 4A, which has an asymmetric structure.

Inside the frame body of the battery holding body 200*a* described together with FIG. 3, a space section is created; there are no other members inside the frame body. In contrast, in the case of FIG. 4, inside a frame body 201, a battery placement plate 204 is provided. The battery holding body shown in FIG. 4 is of a tray type, which is different from the above battery holding body.

The rest of the configuration is the same as that shown in FIG. 3, and will not be described in detail.

The battery holding body 200b shown in FIG. 4 is formed into a tray by providing the battery placement plate 204 in the internal space of the frame body 201 shown in FIG. 3. Therefore, the battery holding body 200b requires more components to be used than the battery holding body 200a shown in FIG. 3, leading to an increase in mass. However, a film-covered battery is more reliably held by the frame body 201 and the battery placement plate 204. Therefore, it is possible to protect the film-covered battery against strong vibration, shock, and the like.

The position where the battery placement plate 204 is provided may be the thickness-direction center of the frame body or one end surface.

Figure 5:
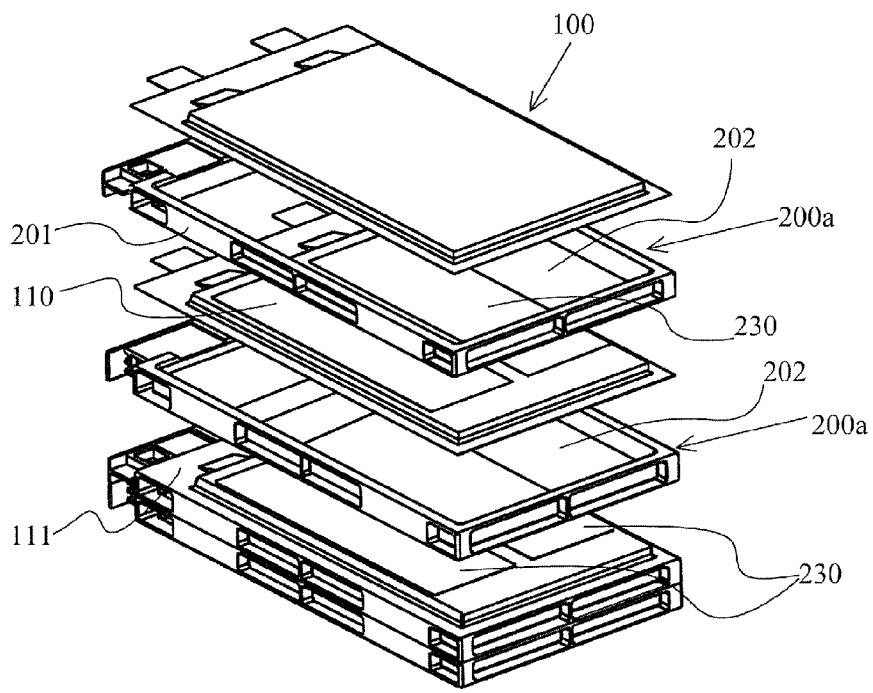
FIG. 5 is a diagram illustrating a method of stacking film-covered batteries that are mounted on battery holding bodies.

FIG. 5 is a diagram illustrating a method of stacking film-covered batteries that are mounted on battery holding bodies.

The example shown in FIG. 5 is a diagram illustrating the film-covered batteries that are stacked with the use of the battery holding bodies shown in FIG. 3.

A body section 110 of a film-covered battery 100 is mounted in a space section 202 of a frame body 201 of a battery holding body 200. On the frame body 201, the peripheral heat-sealing portions of the film-covered battery, such as an upper end section 111 and a lower end section 112, are placed. Then, the components are turned upside down, while the sides from which positive- and negative-electrode pull-out tabs are pulled out are being aligned with one another. Then, the battery holding bodies are stacked alternately to produce a stacked body in which the film-covered batteries are connected in series.

When the battery holding bodies 200 of the present invention are stacked, the use of the fitting concave sections (not shown) and the corresponding fitting convex sections (not shown) makes the stacking easier.

On both stacking surfaces of each film-covered battery 100, a double-faced adhesive tape 230 can be put. Therefore, it is possible to prevent a positional shift caused by vibration or shock.

The size of a plurality of film-covered batteries 100 is set in such a way that an end surface of an outer peripheral portion of the stacked body in which the battery holding bodies 200 mounted on the frame bodies are stacked matches the outer peripheral portions of the film-covered batteries. As a result, the unevenness of the outer shape of the battery module is reduced, resulting in an increase in dimensional precision.

In the case of the stacked body of the present embodiment, inside the frame body 201 of the battery holding body 200a, there is the space section 202 where any other members do not exist. Therefore, the mass of the battery holding body becomes smaller, and a lightweight battery pack can be obtained.

Figure 6:
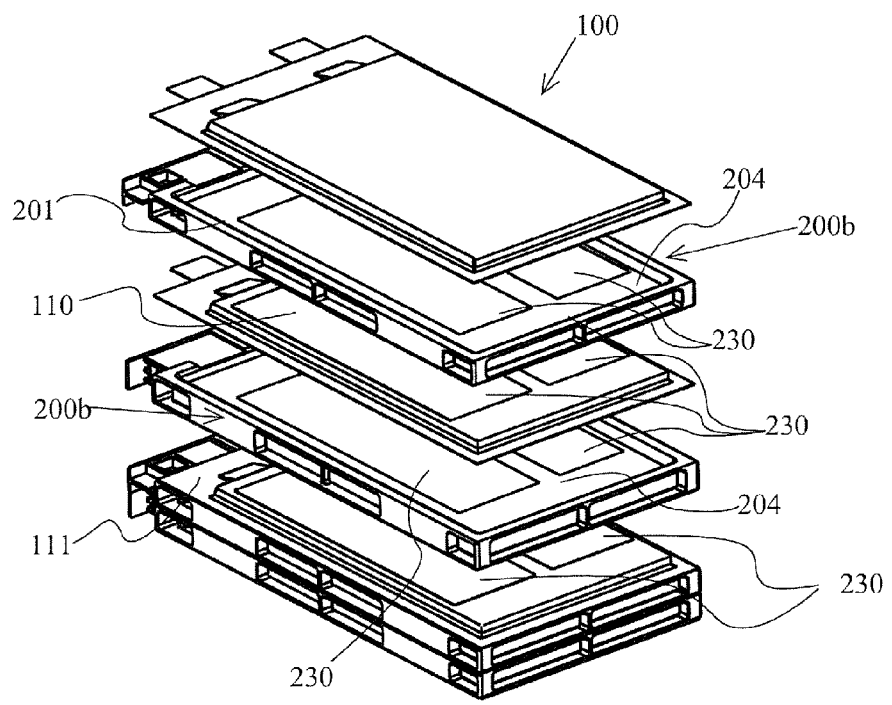
FIG. 6 is a diagram illustrating another method of stacking film-covered batteries that are mounted on battery holding bodies.

FIG. 6 is a diagram illustrating another method of stacking film-covered batteries that are mounted on battery holding bodies.

The example shown in FIG. 6 is a diagram illustrating the film-covered batteries that are stacked with the use of the battery holding bodies shown in FIG. 4.

The battery holding body 200b shown in FIG. 6 is formed into a tray by providing the battery placement plate 204 in the internal space of the frame body 201. Therefore, the battery holding body 200b requires more components to be used than the battery holding body 200a shown in FIG. 3, leading to an increase in mass. However, a film-covered battery 100 is more reliably held by the frame body 201 and the battery placement plate 204. Therefore, it is possible to protect the film-covered battery against strong vibration, shock, and the like.

The position where the battery placement plate 204 is provided may be the thickness-direction center of the frame body or one end surface. When the film-covered battery 100 is to be mounted on the battery holding body 200b, a double-faced adhesive tape 230 may be put on the surface of the battery placement plate 204 where the film-covered battery is placed; a protective film is removed; and then the body section 110 of the film-covered battery 100 may be placed on the double-faced adhesive tape 230 put on the battery placement plate 204.

On the frame body 201, the peripheral heat-sealing portions of the film-covered battery, such as an upper end section 111 and a lower end section 112, are placed. Then, the components are turned upside down, while the sides from which positive- and negative-electrode pull-out tabs are pulled out are being aligned with one another. Then, the battery holding bodies are stacked alternately to produce a stacked body in which the film-covered batteries are connected in series.

When the battery holding bodies 200 of the present invention are stacked, the use of the fitting concave sections (not shown) and the corresponding fitting convex sections (not shown) makes the stacking easier.

On both stacking surfaces of each film-covered battery 100, a double-faced adhesive tape 230 can be put. Therefore, it is possible to prevent a positional shift caused by vibration or shock.

The size of a plurality of film-covered batteries 100 is set in such a way that an end surface of an outer peripheral portion of the stacked body in which the battery holding bodies 200 mounted on the frame bodies are stacked matches the outer peripheral portions of the film-covered batteries. As a result, the unevenness of the outer shape of the battery module is reduced, resulting in an increase in dimensional precision.

Figure 7:
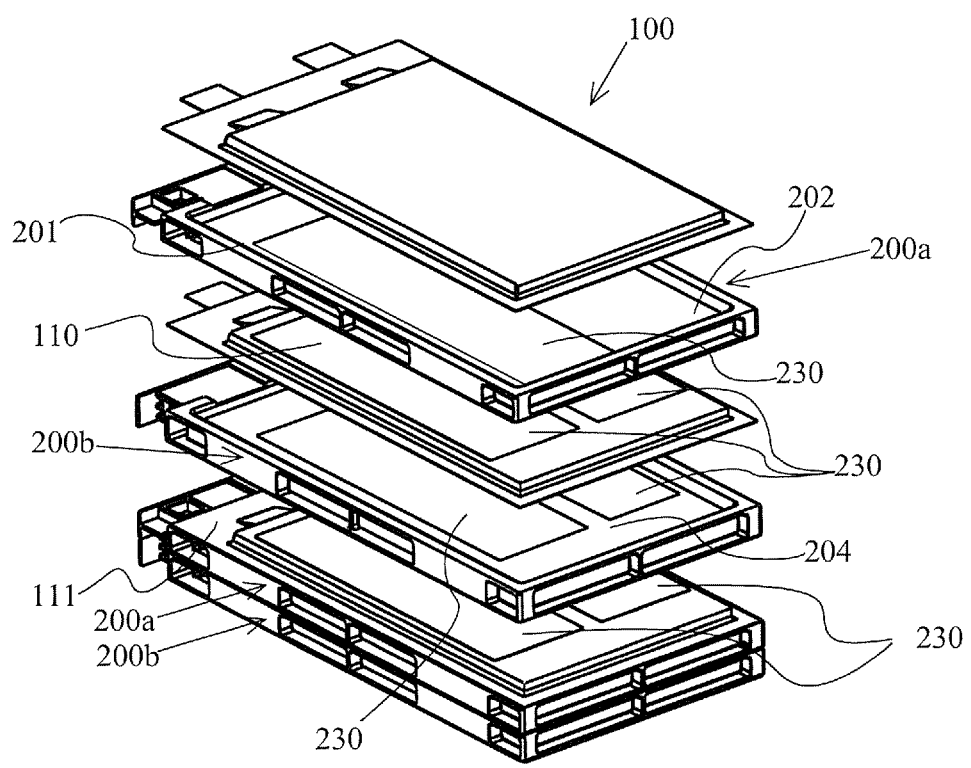
FIG. 7 is a diagram illustrating another method of stacking film-covered batteries that are mounted on battery holding bodies.

FIG. 7 is a diagram illustrating another method of stacking film-covered batteries that are mounted on battery holding bodies.

The example shown in FIG. 7 is a diagram illustrating the film-covered batteries that are stacked with the use of the battery holding body 200a shown in FIG. 3 and the battery holding body 200b shown in FIG. 4.

In the stacked body shown in FIG. 7, the battery holding bodies 200a, in which the film-covered batteries are mounted in the internal spaces 202 provided inside the frame bodies 201, and the battery holding bodies 200b, in which the film-covered batteries are mounted on the battery placement plates 204 provided inside the frame bodies 201, are alternately stacked.

In the stacked body shown in this example, the battery holding bodies 200a, which have the internal spaces, and the battery holding bodies 200b, which are formed into a tray by providing the battery placement plates 204, are alternately stacked. Therefore, compared with the case where only the battery holding bodies 200a with the internal spaces are used, the stacked body is more effective in preventing a positional shift or the like caused by vibration of each film-covered battery 100 or shock, without a significant increase in mass.

The position where the battery placement plate 204 is provided may be the thickness-direction center of the frame body or one end surface.

When the film-covered battery 100 is to be mounted on the battery holding body 200b, a double-faced adhesive tape 230 may be put on the surface of the battery placement plate 204 where the film-covered battery is placed; a surface's protective film is removed; and then the body section 110 of the film-covered battery 100 may be placed on the double-faced adhesive tape 230 put on the placement surface 204.

On the frame body 201 that is thus produced, the peripheral heat-sealing portions of the film-covered battery, such as an upper end section 111 and a lower end section 112, are placed. Then, the components are turned upside down, while the sides from which positive- and negative-electrode pull-out tabs are pulled out are being aligned with one another. Then, the battery holding bodies are stacked alternately to produce a stacked body in which the film-covered batteries are connected in series.

When the battery holding bodies 200 of the present invention are stacked, the use of the fitting concave sections (not shown) and the corresponding fitting convex sections (not shown) makes the stacking easier.

On both stacking surfaces of each film-covered battery 100, a double-faced adhesive tape 230 can be put. Therefore, it is possible to prevent a positional shift caused by vibration or shock.

The size of a plurality of film-covered batteries 100 is set in such a way that an end surface of an outer peripheral portion of the stacked body in which the battery holding bodies 200 mounted on the frame bodies are stacked matches the outer peripheral portions of the film-covered batteries. As a result, the unevenness of the outer shape of the battery module is reduced, resulting in an increase in dimensional precision.

The configuration is not limited to the above one in which the battery holding bodies 200a with the internal spaces and the battery holding bodies 200b with the battery placement plates 204 are alternately stacked. A series of one-type battery holding bodies may be stacked on a series of other-type battery holding bodies. The battery holding bodies may be appropriately combined depending on the characteristics required for a battery-stacked body.

FIG. 8 is a diagram illustrating one example of a battery module that is mounted in a battery pack of the present invention.

Figure 8A:
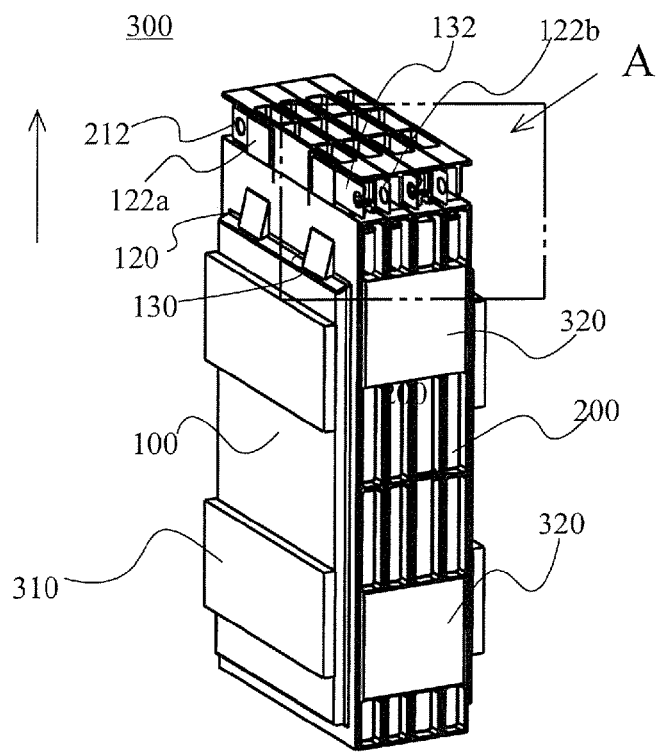
FIG. 8A and FIG. 8B are diagrams illustrating one example of a battery module that is mounted in a battery pack of the present invention.
Figure 8B:
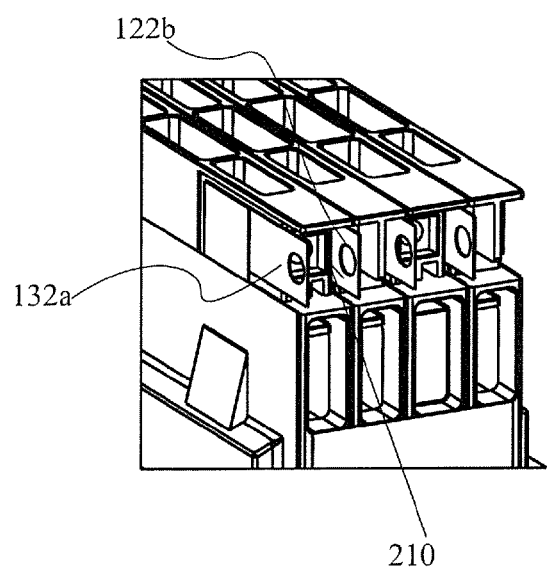

A plurality of battery holding bodies in which film-covered batteries are mounted are stacked, and the battery holding bodies are electrically connected in series or parallel. In this manner, a battery module 300 having a desired voltage or current capacity is produced. In a battery module shown in FIG. 8, as an example, five film-covered batteries are connected in series. FIG. 8A is a perspective view of the entire battery module. FIG. 8B is an enlarged view of a portion of C in FIG. 6A.

A positive-electrode extension tab 122a whose one end is joined to a positive-electrode pull-out tab extends in a direction perpendicular to the direction in which the positive-electrode pull-out tab is pulled out and in a direction opposite to that of a negative-electrode pull-out tab. The positive-electrode extension tab 122a is fixed with screw to a stacking surface screw holding section 212 provided on an outermost surface of a stacking surface of a battery holding body without going around a side surface of a battery holding body 200.

A negative-electrode extension tab 132a whose one end is joined to a negative-electrode pull-out tab is pulled out in a direction opposite to the pull-out direction of the positive-electrode extension tab 122a. The negative-electrode extension tab 132a is bent from a stacking surface of a frame body of a battery holding body to a side surface, along with a positive-electrode extension tab 122b of an adjacent second film-covered battery. The negative-electrode extension tab 132a is then fixed with screw to a side surface screw holding section 210a provided on a side surface of a battery holding body, and is therefore electrically connected together.

Meanwhile, a negative-electrode pull-out tab (not shown) that is pulled out to a side opposite to the positive-electrode extension tab 122b of a second film-covered battery, and a positive-electrode extension tab (not shown) that is attached to a positive-electrode pull-out tab of a third film-covered battery are connected on a side surface of the side opposite to the battery holding body.

Similarly, a positive-electrode extension tab 123c that is connected to a positive electrode tab of a third film-covered battery, and a negative-electrode extension tab 133d that is connected to a negative-electrode pull-out tab of a fourth film-covered battery are bent toward a side surface screw holding section 210b that is located between the two, and are fixed with a screw. Therefore, the tabs are electrically connected together. Furthermore, a positive-electrode extension tab (not shown) that is pulled out from a fourth film-covered battery, and a negative-electrode extension tab (not shown) that is pulled out from a fifth film-covered battery are connected on a side surface of the side opposite to the battery holding body. As a result, a battery module 300 is completed.

On a side surface of the battery holding body, a protruding section 214 is provided. This configuration makes longer a creepage distance between the adjacent side surface screw holding sections 210a and 210b to which the positive- and negative-electrode extension tabs pulled out from adjacent film-covered batteries are connected. Moreover, it is possible to prevent contact of a conductor with the side surface screw holding sections. Therefore, it is possible to improve electric characteristics of the battery module.

In that manner, except for positive- or negative-electrode extension tabs that are located on an outer surface of an end portion of a stacking surface and are used for external connection, the adjacent extension tabs of different polarities are electrically connected with screws. As a result, the conductive connection of each film-covered battery is completed.

What is described above is an example in which the film-covered batteries are electrically connected in series to each other. Alternatively, the film-covered batteries may be connected in parallel by: mounting, on a battery holding body in which no protruding section is formed, a film-covered battery; stacking in such a way that the upper and lower positive- and negative-electrode pull-out tabs of each film-covered battery are aligned with one another; pulling out the positive- and negative-electrode extension tabs in the same direction; and connecting the tabs together with screws in external-connection screw holding sections or side surface screw holding sections provided on the stacking surface.

On an outermost surface of a stacking surface of the battery module 300, cushioning members 310 made of foamed synthetic rubber or the like are put. On an end surface that is located in a direction perpendicular to the stacking surface, adhesive tapes 320 are preferably put for integral fixation in a plurality of flat portions or the like which are provided on an outer surface of the frame body of a battery holding body, in order not to cause a positional shift of each battery holding body 200.

In the battery module, into portions where terminal portions and the like to which battery voltages of different polarities are applied face each other or where the terminal portions and the like are located adjacent to each other, or into screw holding holes for conductive connection of battery holding bodies, or into areas near other voltage applying sections, an insulation filler material may be injected. In this case, it is possible to prevent a short circuit and increase the mechanical strength of the battery module.

Figure 9:
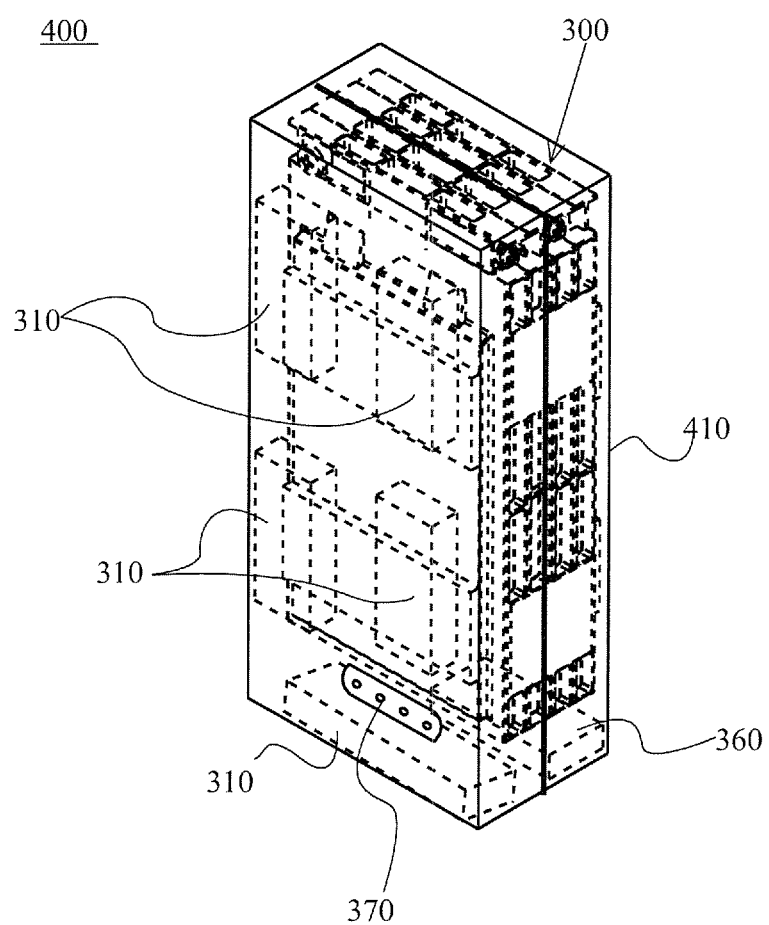
FIG. 9 is a diagram illustrating one example of a battery pack of the present invention.

FIG. 9 is a diagram illustrating one example of a battery pack of the present invention.

A battery pack 400 is made by placing and fixing, in a housing 410, one battery module 300, a battery management unit 360, which includes a charge and discharge control circuit and a battery protection circuit, and cushioning members 310, and by providing an external connection connector 370. Moreover, the battery pack of the present invention is made by stacking the battery holding bodies on which the film-covered batteries are mounted. Therefore, the battery pack can be used in such a way as to be placed at a position where the pull-out direction of the positive- and negative-electrode pull-out tabs faces downward as shown in the diagram.

In the battery module 300 that is thus assembled, all the film-covered batteries are stacked after being held by the battery holding members. Therefore, the battery module is characterized in that the direction in which the film-covered batteries are disposed in the battery pack can be any direction when being mounted regardless of the direction of the positive- and negative-electrode pull-out tabs. Therefore, it is possible to provide a non-conventional battery pack.

Moreover, it is also possible to provide a battery pack that is made by putting, in a housing, two of produced battery modules in such a way that the pull-out directions of the positive- and negative-electrode pull-out tabs of the battery modules face each other.

Figure 10:
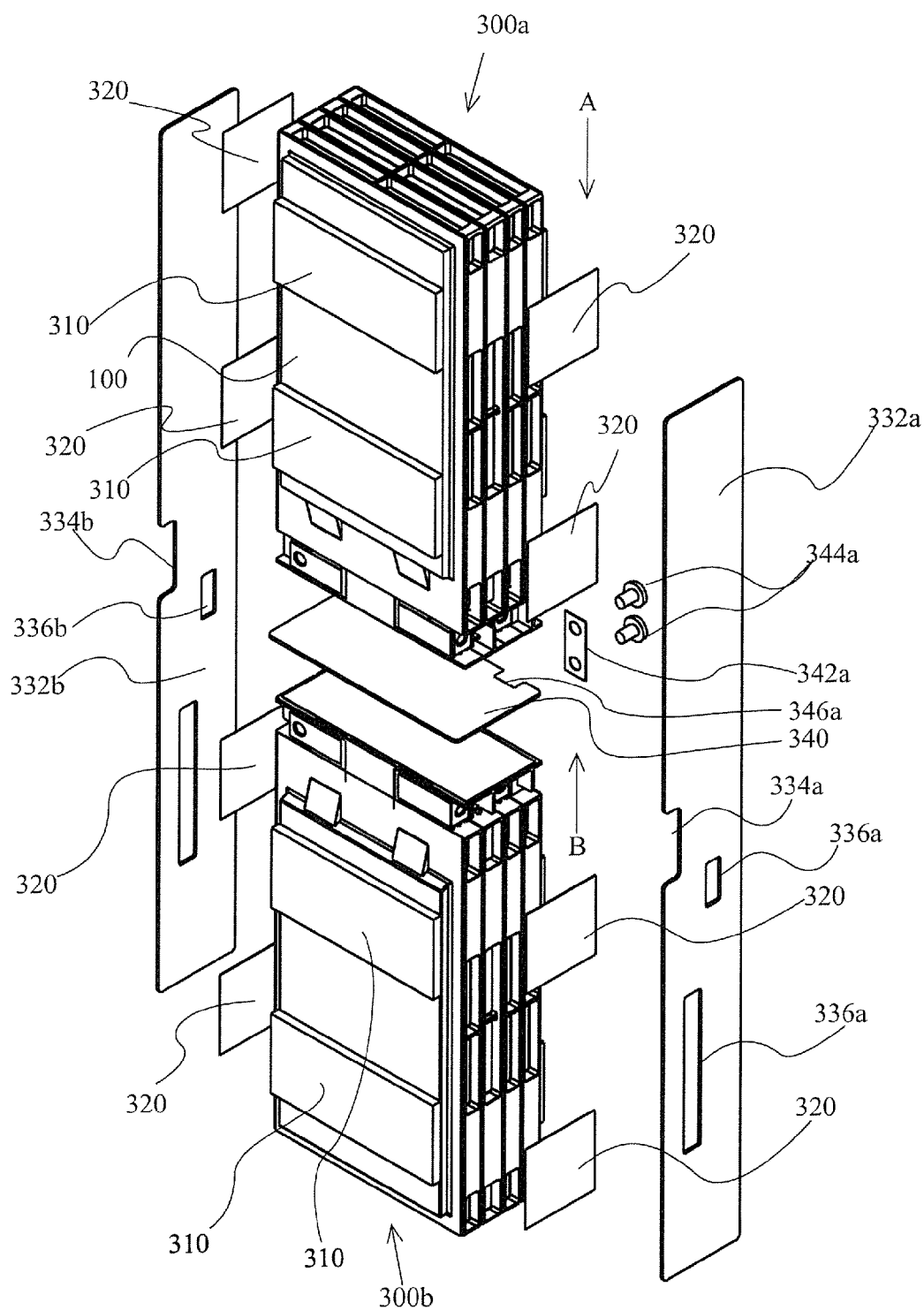
FIG. 10 is an exploded perspective view showing a connection body of two battery modules.

FIG. 10 is an exploded perspective view showing a connection body of two battery modules.

A battery module connection body shown in FIG. 10 is made by preparing two battery modules 300*a* and 300*b* as described above, and by disposing the battery modules in such a way that the pull-out directions A and B of the positive- and negative-electrode pull-out tabs of the battery modules face each other. On both surfaces of outermost surfaces of stacking surfaces of each battery module 300*a*, 300*b*, cushioning members 310 made of foamed synthetic rubber or the like are put. On an end surface that is located in a direction perpendicular to the stacking surface, in order to prevent a positional shift of each battery module 300*a*, 300*b*, reinforcing members 332*a* and 332*b*, which extend along both surfaces of a direction perpendicular to the battery stacking surfaces of the two battery modules 300*a* and 300*b*, are attached with double-faced adhesive tapes 322, which are put in a plurality of locations.

Between the battery modules 300*a* and 300*b*, an insulation member 340 is disposed. An inter-battery-module connection tab 342*a*, which is attached to the battery modules 300*a* and 300*b*, is joined with attachment screws 344*a*. In this manner, the battery modules are electrically connected.

In a concave section 346*a* that is formed on the insulation member 340 disposed between the two batter modules, the inter-battery-module connection tab 342*a* is placed. This configuration makes shorter the conductive connection between the battery modules 300*a* and 300*b*, and ensures sufficient electric insulation between the two battery modules.

The reinforcing members 332*a* and 332*b* have the same shape. On the reinforcing members 332*a* and 332*b*, passage concave sections 334*a* and 334*b* for an input and output lead line and a sense-line lead line used to detect the state of each battery module and each film-covered battery, and thermistor embedding holes 336*a* and 336*b* are provided.

Figure 11:
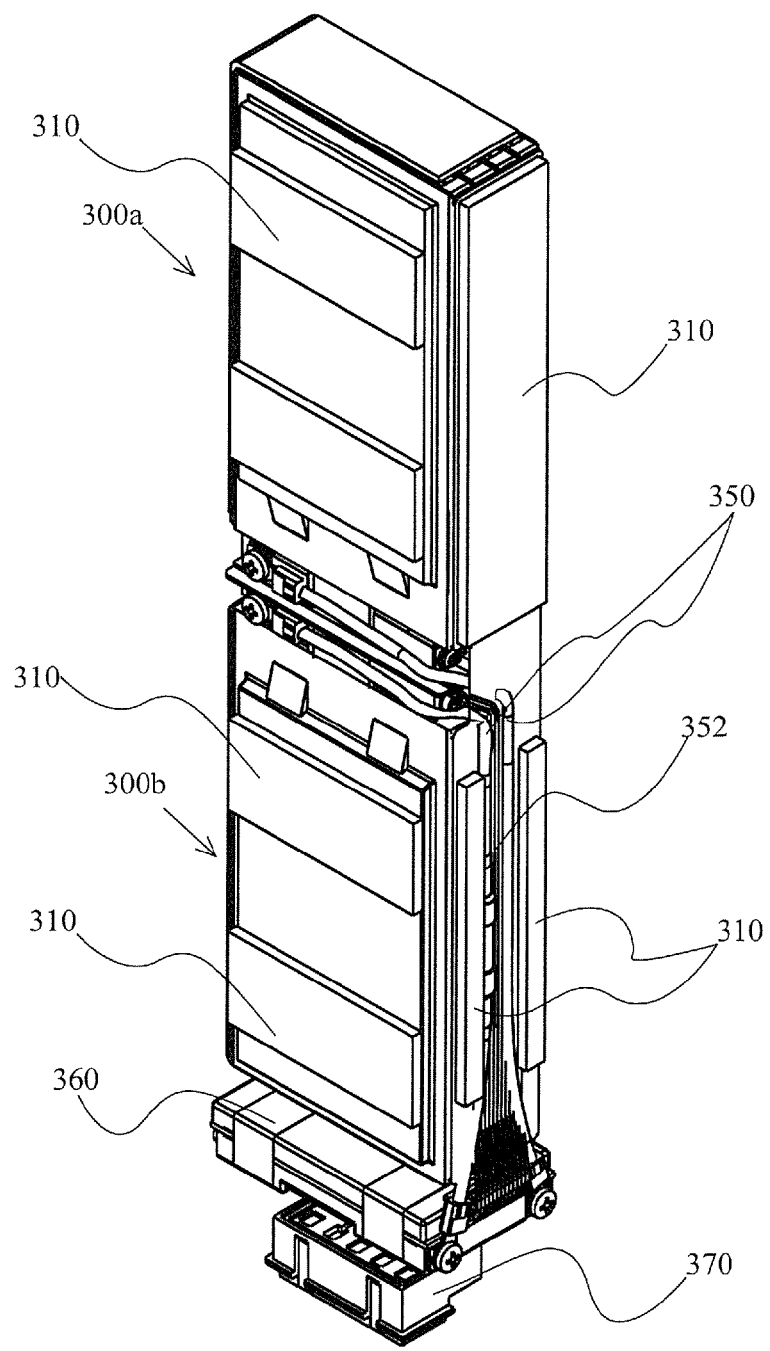
FIG. 11 is a perspective view showing a connection body in which two battery modules are connected.

FIG. 11 is a perspective view showing a connection body in which two battery modules are connected.

As shown in FIG. 10, in the case of the battery modules 300*a* and 300*b*, the pull-out directions of the positive- and negative-electrode pull-out tabs face each other; an insulation member is placed between the two; the battery modules are combined together by attaching the reinforcing members to both side surfaces; the cushioning members 310 are attached to the periphery with double-faced adhesive tapes; the input and output lead 350 and the sense-line lead line 352 pass between the cushioning members 310*a* and 310*b* and are connected to the battery management unit 360; and the external connection connector 370 is connected to the battery management unit 360.

In the battery module connection body 380 of the present invention, the wires extending from the positive- and negative-electrode pull-out tabs of each film-covered battery to the battery management unit 360 are made equal in length. Therefore, the battery module connection body 380 with excellent electric characteristics can be obtained.

Figure 12:
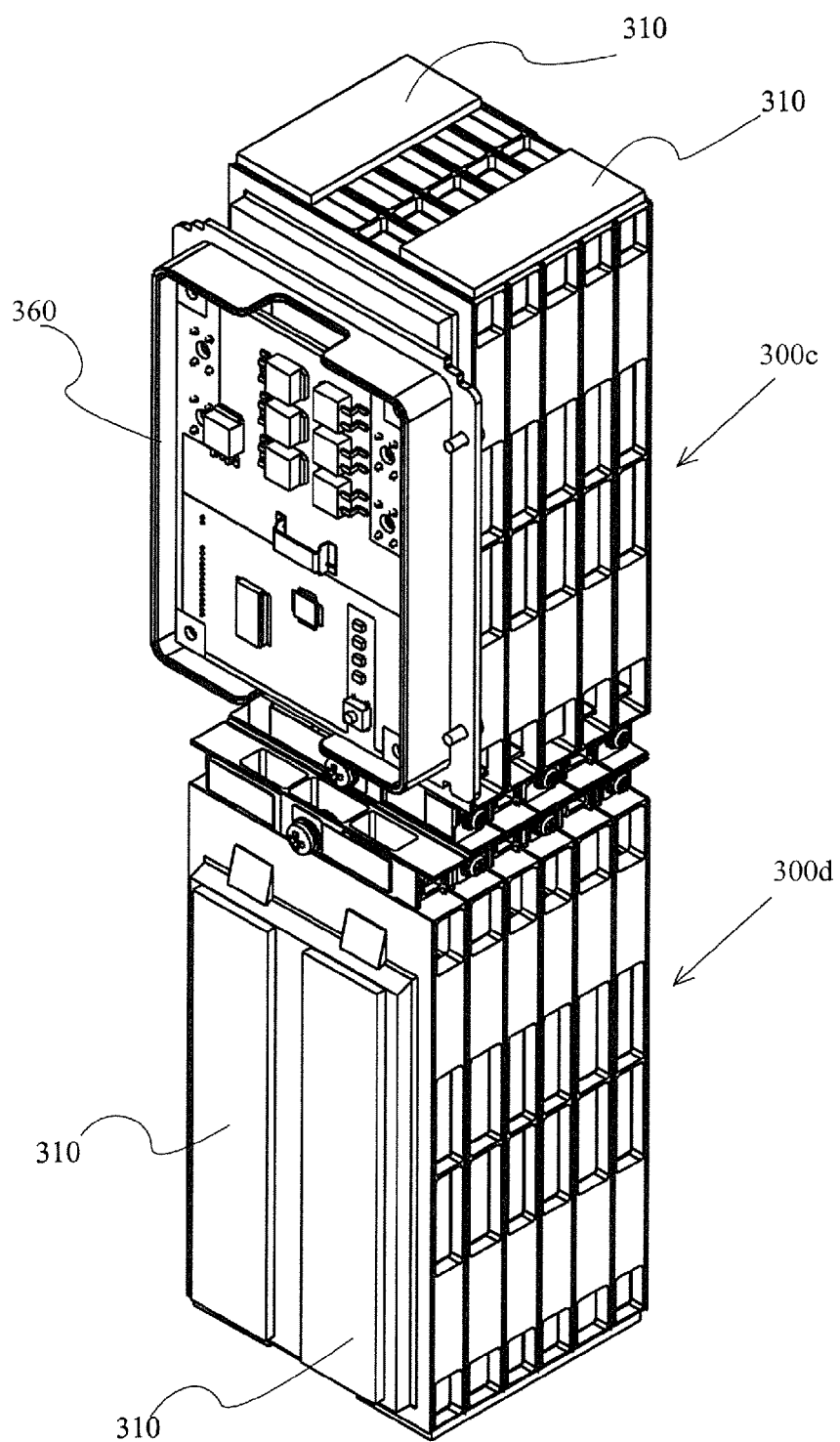
FIG. 12 is a perspective view showing another example of a connection body in which two battery modules are connected.

FIG. 12 is a perspective view showing another example of a connection body in which two battery modules are connected.

The battery module connection body shown in FIG. 12 is made by connecting the battery modules shown in FIG. 8 in the same way as that showing in FIG. 10. However, the number of battery holding bodies 200 holding film-covered batteries that are stacked is different between the battery modules 300*c* and 300*d*. In a battery module in which the number of battery holding bodies stacked is smaller, the battery management unit 360 is mounted.

As a result, in the case of the battery modules shown in FIG. 12, the length of the battery connection body is smaller than one in which a battery management device is mounted in one end portion of a length direction of a connection body of two battery modules as shown in FIG. 11.

As described above, in a battery pack that uses the battery modules of the present invention, the degree of freedom in the direction in which the battery modules are disposed is high. Therefore, the wires extending to the battery management device 360 are equal in length, and a battery pack that has excellent electric characteristics and a high degree of freedom in installation location can be provided.

Figure 13:
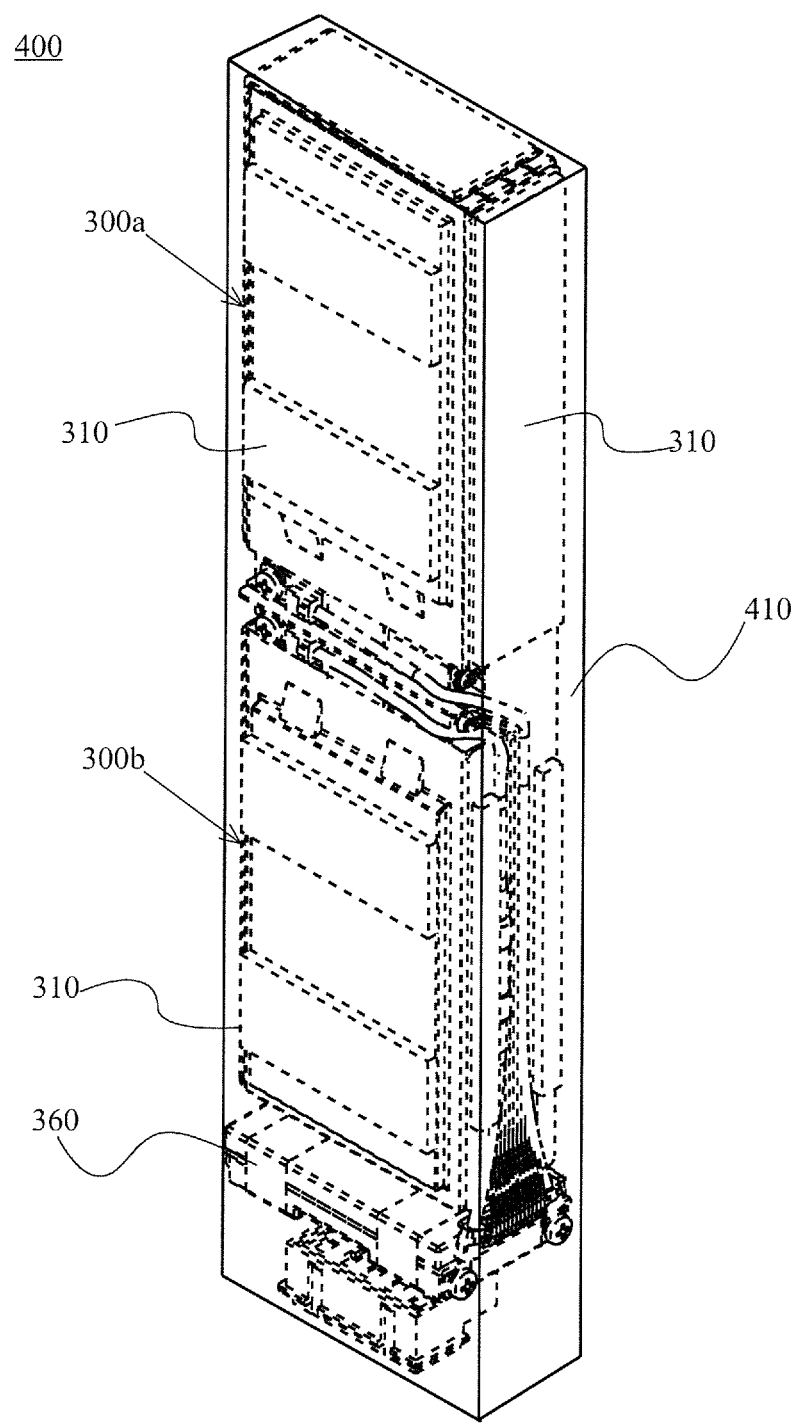
FIG. 13 is a diagram illustrating one example of a battery pack of the present invention.

FIG. 13 is a diagram illustrating one example of a battery pack of the present invention.

A battery pack 400 is made by mounting, in a housing 410, the connection body shown in FIG. 11, which is made by connecting two battery modules 310*a* and 310*b* in such a way that the pull-out directions of the positive- and negative-electrode pull-out tabs of the battery modules face each other.

In each battery module in which the battery holding bodies are stacked, elastic cushioning members 310 are disposed on the periphery. Therefore, in the battery pack, the battery modules 300*a* and 300*b* are not adversely affected by vibration. Therefore, the battery pack can be safely used even when the pull-out directions of the positive- and negative-electrode pull-out tabs face downward.

Moreover, the battery pack 400 is a battery pack to which an external connection connector 370, which is connected to the battery management unit 360 placed in a bottom portion of the housing 410, is connected. Therefore, the wires extending from each of the film-covered batteries that make up the battery modules 300a and 300b to the battery management unit are equal in length. Thus, the battery pack with excellent electric characteristics can be provided.

In the battery pack of the present invention, the film-covered batteries that constitute the battery pack are held by the battery holding bodies. Therefore, the battery pack has excellent characteristics, i.e. the battery pack can be disposed in any direction when being mounted on a device that uses the battery pack.

Accordingly, when the battery pack of the present invention is mounted on an electric bicycle, the battery pack can be mounted not only along a seat tube, which is part of a frame, but also along a top tube in a substantially horizontal direction. The battery pack can also be mounted on a tab down tube in such a way that the positive- and negative-electrode pull-out tabs face downward, or may be mounted in any other way. In this manner, the battery pack is characterized by being able to improve the degree of freedom in the design of electric bicycles.

INDUSTRIAL APPLICABILITY

The battery pack of the present invention is a battery pack including the battery module that is made by: stacking battery holding bodies, on which film-covered batteries are mounted with positive- and negative-electrode pull-out tabs being taken out from the same side, in such a way that the sides from which the positive- and negative-electrode pull-out tabs are pulled out are aligned with each other; connecting extension tabs to each of the other portions; bending the extension tabs along a side surface in a direction perpendicular to a battery stacking surface; and piling up and electrically connecting the extension tabs. It is possible to provide a battery pack that has high resistance against vibration and shock and ensures a high degree of freedom in installation even when being used for an electric bicycle or the like.

EXPLANATION OF REFERENCE SYMBOLS

A, B: Pull-out directions of positive- and negative-electrode pull-out tabs
100: Film-covered battery
110: Battery body section
111: Upper end section
111A: Upper end section outer edge
112: Lower end section
112A: Lower end section outer edge
120: Positive-electrode pull-out tab
130: Negative-electrode pull-out tab
122: Positive-electrode extension tab
132: Negative-electrode extension tab
200, 200a, 200b: Battery holding body
201: Frame body
202: Space section
203: Stacking surface
204: Battery placement plate
206: Outer peripheral-side concave section
207: Stacking surface-side concave section
208: Partition wall
209: Flat surface
210: Side surface screw holding section
212: Stacking surface screw holding section
214: Protruding section
216: Fitting concave section
218: Fitting convex section
230: Double-faced adhesive tape
300, 300a, 300b, 300c, 300d: Battery module
310: Cushioning member
320: Adhesive bonding tape
322: Double-faced adhesive tape
332a, 332b: Reinforcing member
334a, 334b: Lead-line passage concave section
336a, 336b: Thermistor embedding hole
340: Insulation member
342a: Inter-battery-module connection tab
344a: Attachment screw
346a: Concave section
350: Input and output lead
352: Sense-line lead line
360: Battery management unit
370: External connection connector
380: Battery module connection body
400: Battery pack
410: Housing

The invention claimed is:

1. A battery pack characterized by comprising
a battery module that is made by stacking battery holding bodies on which film-covered batteries are placed with positive- and negative-electrode pull-out tabs being taken out from the same side in such a way that sides from which the positive- and negative-electrode pull-out tabs are pulled out are aligned with each other, wherein:
an extension tab is connected to at least the positive- or negative-electrode pull-out tab;
the extension tab connected to the positive-electrode pull-out tab extends in a direction perpendicular to a direction of the positive-electrode pull-out tab, and is pulled out from a battery holding body;
the extension tab connected to the negative-electrode pull-out tab extends in a direction that is perpendicular to a direction of the negative-electrode pull-out tab and opposite to the direction of the extension tab connected to the positive-electrode pull-out tab, and is pulled out from a battery holding body; and
the extension tabs are each bent along a side surface in a direction perpendicular to a battery stacking surface, and are stacked up and electrically connected.

2. The battery pack according to claim 1, characterized in that
a positive- or negative-electrode pull-out tab of the battery that is located in an outermost layer of the battery module is screwed at a position parallel to a stacking surface regardless of whether or not the extension tab is connected.

3. The battery pack according to claim 1, characterized in that
the battery modules are electrically connected together in such a way that, among end surfaces of the battery modules, the sides of each film-covered battery from which the positive- and negative-electrode pull-out tabs are pulled out face each other, and that an insulation member is placed between the modules.

4. The battery pack according to claim 1, characterized in that:
side surfaces of the battery modules are reinforced by a common reinforcing member;

and, in locations except where the battery modules are connected together, the insulation member protrudes along a stacking direction more than the tab, thereby preventing a short circuit between the battery modules.

5. The battery pack according to claim 1, characterized in that
the battery holding body is one that is made up of only a frame body on which an outer peripheral portion of a film-covered battery is stacked, or one that includes a support body to cover an entire surface of the frame body.

6. The battery pack according to claim 1, characterized in that:
in a frame body of the battery holding body, both a stacking surface-side concave section, which has an opening communicating with a stacking surface side of a film-covered battery, and an outer peripheral surface-side concave section, which has an opening on an outer peripheral surface of the frame body, are formed; on an outer peripheral surface side of the stacking surface-side concave section, a flat portion is formed.

7. The battery pack according to claim 1, characterized in that
the battery holding body is bilaterally asymmetric when seen from a stacking surface side of the film-covered battery.

8. The battery pack according to claim 1, characterized in that:
one side surface of the holding body has a screw hole used for connecting positive- and negative-electrode extension tabs together; and the other side surface of the holding body includes a protruding section that makes it possible to prevent improper connection and elongate a creepage distance.

9. The battery pack according to claim 1, characterized in that
the holding bodies are turned upside down and alternately stacked in such a way that the sides from which the positive- and negative-electrode pull-out tabs are pulled out are being aligned with each other.

10. The battery pack according to claim 1, characterized in that
a portion in which voltage applying sections of different polarities face each other is filled with an insulation composition via an opening.

11. The battery pack according to claim 1, characterized in that
a battery management unit that includes a battery charge-and-discharge control circuit and a battery protective circuit is disposed on a side where the positive- and negative-electrode pull-out terminals do not face each other.

12. The battery pack according to claim 1, characterized in that:
the battery modules are different in size; and the battery management unit is placed on a small battery module.

13. The battery pack according to claim 1, characterized in that:
the battery pack is used in an electric bicycle or electric motorcycle; and, in the modules, the positive- and negative-electrode pull-out tabs are disposed in a downward direction.

* * * * *